US009683606B2

(12) United States Patent
Matsushita

(10) Patent No.: US 9,683,606 B2
(45) Date of Patent: Jun. 20, 2017

(54) ROLLING BEARING

(71) Applicant: NTN CORPORATION, Osaka (JP)

(72) Inventor: Tomoki Matsushita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/102,630

(22) PCT Filed: Nov. 25, 2014

(86) PCT No.: PCT/JP2014/081086
§ 371 (c)(1),
(2) Date: Jun. 8, 2016

(87) PCT Pub. No.: WO2015/098397
PCT Pub. Date: Jul. 2, 2015

(65) Prior Publication Data

US 2016/0312829 A1 Oct. 27, 2016

(30) Foreign Application Priority Data

Dec. 24, 2013 (JP) ................................ 2013-265441

(51) Int. Cl.
*F16C 35/073* (2006.01)
*F16C 33/58* (2006.01)
*F16C 19/36* (2006.01)

(52) U.S. Cl.
CPC .......... *F16C 33/586* (2013.01); *F16C 19/364* (2013.01); *F16C 35/073* (2013.01); *F16C 2223/10* (2013.01); *F16C 2361/65* (2013.01)

(58) Field of Classification Search
CPC ..... F16C 35/073; F16C 33/586; F16C 19/364
See application file for complete search history.

(56) References Cited

U.S. PATENT DOCUMENTS 3,972,574 A * 8/1976 Pitner .................... F16C 19/30 384/621
5,647,675 A * 7/1997 Metten .................... F16C 19/30 384/606

(Continued)

FOREIGN PATENT DOCUMENTS

JP 60-29964 2/1985
JP 2002-323049 11/2002

(Continued)

OTHER PUBLICATIONS

International Search Report issued Jan. 13, 2015 in International (PCT) Application No. PCT/JP2014/081086.

(Continued)

*Primary Examiner* — Thomas R. Hannon
(74) *Attorney, Agent, or Firm* — Wenderoth, Lind & Ponack, L.L.P.

(57) ABSTRACT

A washer (5) to be mounted to an end surface (14) of an inner ring includes an extension portion (52) extending along an outer peripheral surface (15) of the inner ring. The extension portion (52) includes an engaging projection portion (53) to be engaged with an engaging recessed portion (16) formed in the outer peripheral surface (15) of the inner ring. The engaging projection portion (53) includes a rounded curved surface portion (55), and a flat surface portion (54) formed continuously with a forward side in a pressing direction of the rounded curved surface portion (55) and inclined radially outward.

20 Claims, 5 Drawing Sheets

(56) References Cited

U.S. PATENT DOCUMENTS

2011/0075959 A1 3/2011 Koizumi
2013/0127235 A1* 5/2013 Yamamoto .......... B60B 27/0005
301/109

FOREIGN PATENT DOCUMENTS

JP 2009-299845 12/2009
JP 2012-145181 8/2012

OTHER PUBLICATIONS

International Preliminary Report on Patentability and Written Opinion of the International Searching Authority issued Jun. 28, 2016 in corresponding International Application No. PCT/JP2014/081086.

* cited by examiner

ROLLING BEARING

TECHNICAL FIELD

The present invention relates to a rolling bearing, and more particularly, to a rolling bearing configured to support, in a freely rotatable manner, a gear shaft of a gear reducer, for example, in transmissions and differentials of automobiles or other vehicles.

BACKGROUND ART

As a rolling bearing configured to support, in a freely rotatable manner, a gear shaft of a gear reducer, for example, in transmissions and differentials of automobiles or other vehicles, there have been widely used tapered roller bearings capable of supporting a radial load and an axial load.

In the gear reducers of this type, when high torque is input, the gear shaft may be twisted. As a result, there may occur stick-slip (slippage) between an end surface of an inner ring and an end surface of a flange of the gear shaft, which comes into contact with the end surface of the inner ring. In addition, the occurrence of the stick-slip may lead to abrasion of the end surface of the inner ring and the end surface of the flange of the gear shaft along with abnormal noise, thereby shortening a life of the gear reducer is shortened.

Therefore, as described, for example, in Patent Literature 1, a washer is mounted to the end surface of the inner ring such that the washer is interposed between the end surface of the inner ring and the end surface of the flange of the gear shaft. In this way, the abrasion between the end surfaces is suppressed.

Specifically, in Patent Literature 1, the washer includes a washer body to be held in contact with the end surface of the inner ring, and an extension portion (claw portion) extended from the washer body along an outer peripheral surface of the inner ring. The extension portion includes engaging projection portions. By engaging those engaging projection portions with an engaging recessed portion formed in the outer peripheral surface of the inner ring, the washer is mounted to the inner ring. A clearance is secured between the extension portion of the washer and the outer peripheral surface of the inner ring. With this configuration, a dimensional tolerance of the washer may be relaxed, and mounting work of the washer to the inner ring may be facilitated. As a result, there is an advantage in that manufacturing cost may be significantly reduced in comparison with that in a case of mounting the washer to the inner ring through press-fitting.

CITATION LIST

Patent Literature 1: JP 2009-299845 A

SUMMARY OF INVENTION

Technical Problem

Incidentally, in Patent Literature 1, at the time of engaging the engaging projection portion of the washer with the engaging recessed portion of the inner ring, the extension portion of the washer needs to be elastically deformed radially outward such that the engaging projection portion overrides the outer peripheral surface of the inner ring.

However, as described in Patent Literature 1, when the engaging projection portion includes only a rounded curved surface portion, the following problem may arise.

Specifically, as illustrated in FIG. 6, when an extension portion 101 of a washer 100 is pressed onto an outer peripheral surface 201 of an inner ring 200, first, a curved surface portion 103 on a forward side in a pressing direction of an engaging projection portion 102 (direction of the arrow in FIG. 6) comes into contact with a chamfered portion 203 formed at an intersecting portion between an end surface 202 and the outer peripheral surface 201. In other words, the engaging projection portion 102 passes over the chamfered portion 203, overrides the outer peripheral surface 201, and then is engaged with an engaging recessed portion 204. The chamfered portion 203 has a rounded curved surface, and hence causes, as illustrated on an enlarged scale in FIG. 6, the curved surface portion 103 of the engaging projection portion 102 and the chamfered portion 203 to be held in forceful contact with their curved surfaces being held in abutment against each other. Thus, in this state, when the engaging projection portion 102 is pressed toward the chamfered portion 203, the curved surface portion 103 of the engaging projection portion 102 is stuck to the chamfered portion 203, and high resistance is imposed to the engaging projection portion 102. As a result, stress concentration may occur at the engaging projection portion 102, thereby damaging the washer 100. When hardening treatment is performed on surfaces of the washer 100 to enhance the abrasion resistance of the washer, a toughness of the washer 100 is reduced. Particularly in this case, when the stress concentration occurs at the engaging projection portion 102, the washer 100 is liable to crack.

In view of the circumstances described above, the present invention has been made to achieve an object of providing a washer-equipped rolling bearing in which stress concentration to be occurred at an engaging projection portion of a washer is alleviated at the time of mounting the washer to an inner ring, to thereby reliably reduce damage to the washer.

Solution to Problem

According to the present invention, which has been devised to solve the above-mentioned problem, there is provided a rolling bearing comprising: an inner ring; an outer ring; a plurality of rolling elements received in an annular space between the inner ring and the outer ring; and a washer comprising: a washer body to be held in contact with an end surface of the inner ring; and an extension portion extending from the washer body along an outer peripheral surface of the inner ring, wherein the inner ring comprises: an engaging recessed portion formed in the outer peripheral surface thereof; and a chamfered portion formed at an intersecting portion between the end surface and the outer peripheral surface, wherein the extension portion of the washer comprises an engaging projection portion, wherein the extension portion and the engaging recessed portion are engaged with each other by pressing the extension portion of the washer onto the outer peripheral surface of the inner ring, and wherein the engaging projection portion comprises: a rounded curved surface portion; and a flat surface portion formed continuously with a forward side in a pressing direction of the rounded curved surface portion and inclined radially outward.

According to such a configuration, in the course of pressing the engaging projection portion of the washer onto the outer peripheral surface of the inner ring, first, the flat surface portion of the engaging projection portion comes into contact with the chamfered portion of the inner ring. The flat surface portion of the engaging projection portion has a flat surface inclined radially outward. Thus, the flat surface portion is less liable to be halfway stuck to the chamfered portion, and hence is moved smoothly along the chamfered portion. With this, occurrence of excessive stress concentration on the engaging projection portion may be prevented.

In the above-mentioned configuration, it is preferred that the curved surface portion comprise a plurality of circular-arc portions having different radii of curvature and that a radius of curvature of a circular-arc portion located on the forward side in the pressing direction be smaller than a radius of curvature of another circular-arc portion located on a rearward side in the pressing direction.

With this configuration, toward the forward side in the pressing direction, a degree of curvature of the circular-arc portions is increased. Thus, in comparison with a case where a single circular-arc having the radius of curvature equal to that of a circular-arc portion located at a rearward end in the pressing direction is formed continuously with the flat surface portion of the engaging projection portion, an axial dimension of the engaging projection portion (dimension in the pressing direction) may be reduced. As a result, an axial dimension of the engaging recessed portion conforming to the engaging projection portion may also be reduced. With this, on the outer peripheral surface of the inner ring, portions out of the engaging projection portion may be sufficiently secured. Thus, reduction in strength of the inner ring, which may be caused depending on a shape of the engaging recessed portion, may be suppressed, and hence damage such as chipping of the outer peripheral surface of the inner ring may be prevented.

In this case, it is preferred that the curved surface portion comprise: a first circular-arc portion located on the forward side in the pressing direction and having a small radius of curvature; and a second circular-arc portion located on the rearward side in the pressing direction and having a large radius of curvature, and that an intersection between the first circular-arc portion and the second circular-arc portion be located at a top of the engaging projection portion.

With this configuration, the curved surface portion comprises two circular-arc portions having different radii of curvature, and hence a relatively simplified shape may be obtained. Thus, the washer may easily be manufactured even through press working or other plastic working, and hence manufacturing cost may be reduced. Further, the intersection between the first circular-arc portion and the second circular-arc portion is located at the top of the engaging projection portion. With this, both the circular-arc portions are easily, smoothly connected to each other, and hence the engaging projection portion may be smoothly pressed. The top of the engaging projection portion refers to a peak of the engaging projection portion and its vicinity.

In the above-mentioned configuration, it is preferred that the flat surface portion form an inclination angle of 45 degrees or less.

With this configuration, the inclination angle of the flat surface portion of the engaging projection portion is gently formed, and hence the flat surface portion of the engaging projection portion may be moved more smoothly along the chamfered portion of the inner ring.

In the above-mentioned configuration, it is preferred that at an intersection between the outer peripheral surface and the chamfered portion, a tangent line of the chamfered portion form an inclination angle of 45 degrees or less.

With this configuration, the outer peripheral surface and the chamfered portion of the inner ring are connected to each other with a gentle inclination. Thus, the flat surface portion and the curved surface portion of the engaging projection portion are easily shifted more smoothly from the chamfered portion of the inner ring to the outer peripheral surface of the inner ring.

In the above-mentioned configuration, it is preferred that a surface of the washer be subjected to hardening treatment.

With this configuration, abrasion resistance of the washer may be enhanced. Further, even when the toughness of the washer is reduced as a result of the hardening treatment, damage to the washer may be prevented because the shape of the engaging projection portion is improved as described above.

In the above-mentioned configuration, it is preferred that the outer peripheral surface of the inner ring comprise: a tapered raceway surface; a small flange portion formed on a small-diameter side of the tapered raceway surface; and a large flange portion formed on a large-diameter side of the tapered raceway surface, that an inner peripheral surface of the outer ring comprise a tapered raceway surface, and that the rolling elements comprise tapered rollers received in a freely rollable manner in an annular space formed between the raceway surface of the inner ring and the raceway surface of the outer ring.

Advantageous Effects of Invention

As described above, according to the embodiment of the present invention, the flat surface portion is formed on the forward side in the pressing direction of the engaging projection portion. With this configuration, the engaging projection portion of the washer is moved to the outer peripheral surface of the inner ring while being moved smoothly along the chamfered portion of the inner ring. Thus, stress concentration on the engaging projection portion of the washer is less liable to occur, and hence the damage to the washer may be reliably prevented.

DESCRIPTION OF EMBODIMENT

Figure 1:
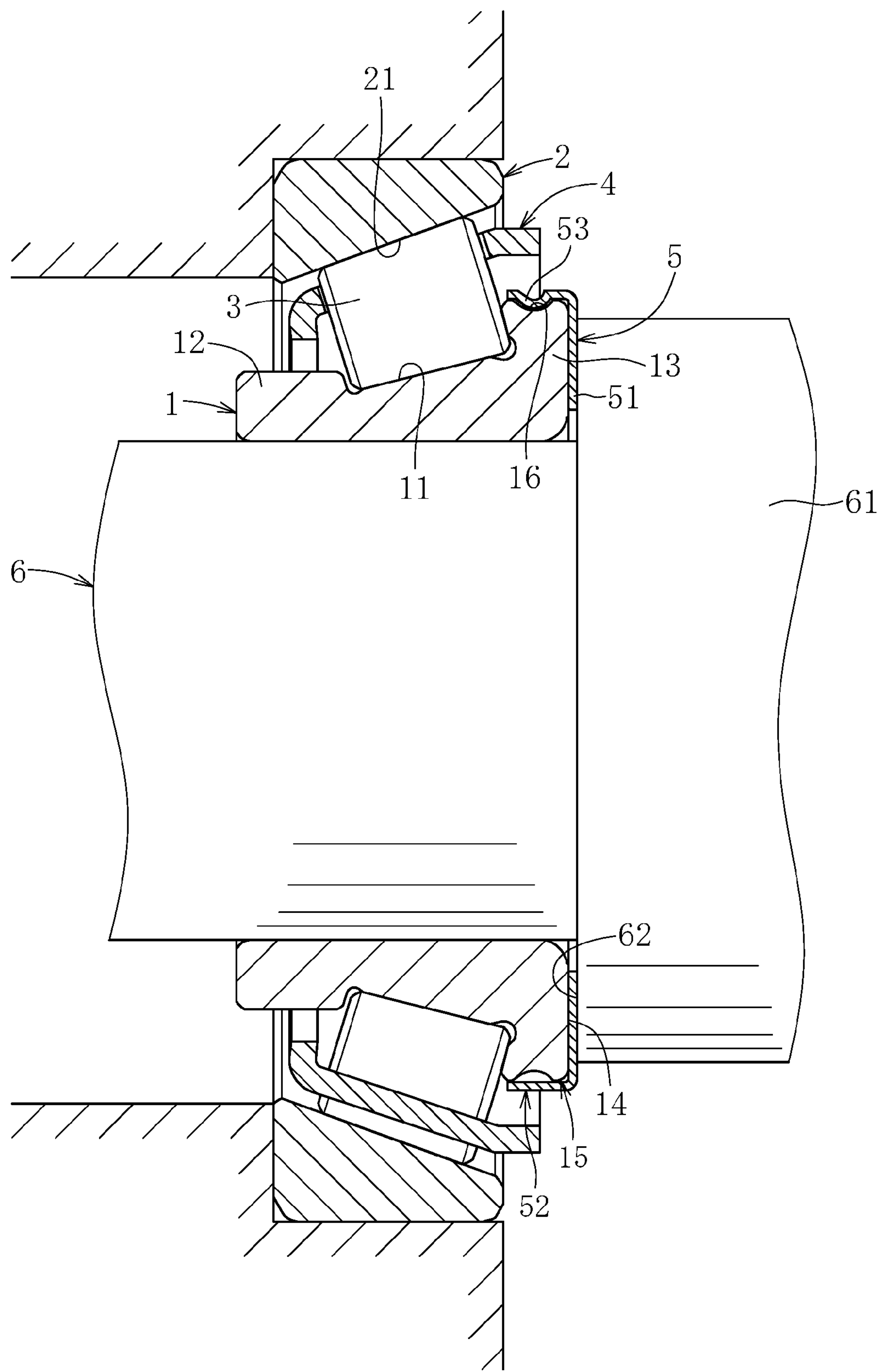
FIG. 1 is a sectional view for illustrating an overall configuration of a tapered roller bearing according to an embodiment of the present invention.

As illustrated in FIG. 1, a tapered roller bearing provided as a rolling bearing according to an embodiment of the present invention comprises, as main components, an inner ring 1, an outer ring 2, and a plurality of tapered rollers 3 serving as rolling elements. The tapered roller bearing is used, for example, in a gear reducer for transmissions and differentials of automobiles.

The inner ring 1 has a tapered raceway surface 11 along its outer peripheral surface, a small flange portion 12 on a small-diameter side of the raceway surface 11, and a large flange portion 13 on a large-diameter side of the raceway surface 11.

The outer ring 2 is arranged on the outer side of the inner ring 1, and has a tapered raceway surface 21 along its inner peripheral surface.

The plurality of tapered rollers 3 are received in a freely rollable manner in an annular space between the raceway surface 11 of the inner ring 1 and the raceway surface 21 of the outer ring 2. The tapered rollers 3 are retained at predetermined intervals by a cage 4.

Further, a configuration of the tapered roller bearing according to this embodiment is featured in comprising a washer 5. The washer 5 is mounted to an end surface 14 on the large flange portion 13 side of the inner ring 1, and serves a function to prevent abrasion of the end surface 14 of the inner ring 1 and an end surface 62 of a flange portion 61 of a gear shaft 6. In addition, the inner ring 1 and the washer 5 are integrated with each other, and hence there is an advantage in that assembly work of the bearing is facilitated.

On surfaces of the washer 5, in order to prevent abrasion of the washer 5, hardened layers are formed through nitriding treatment (quenching). For the same purpose, layers of a solid lubricant may be formed on the surfaces of the washer 5 instead of or in combination with the hardened layers.

Figure 2A:
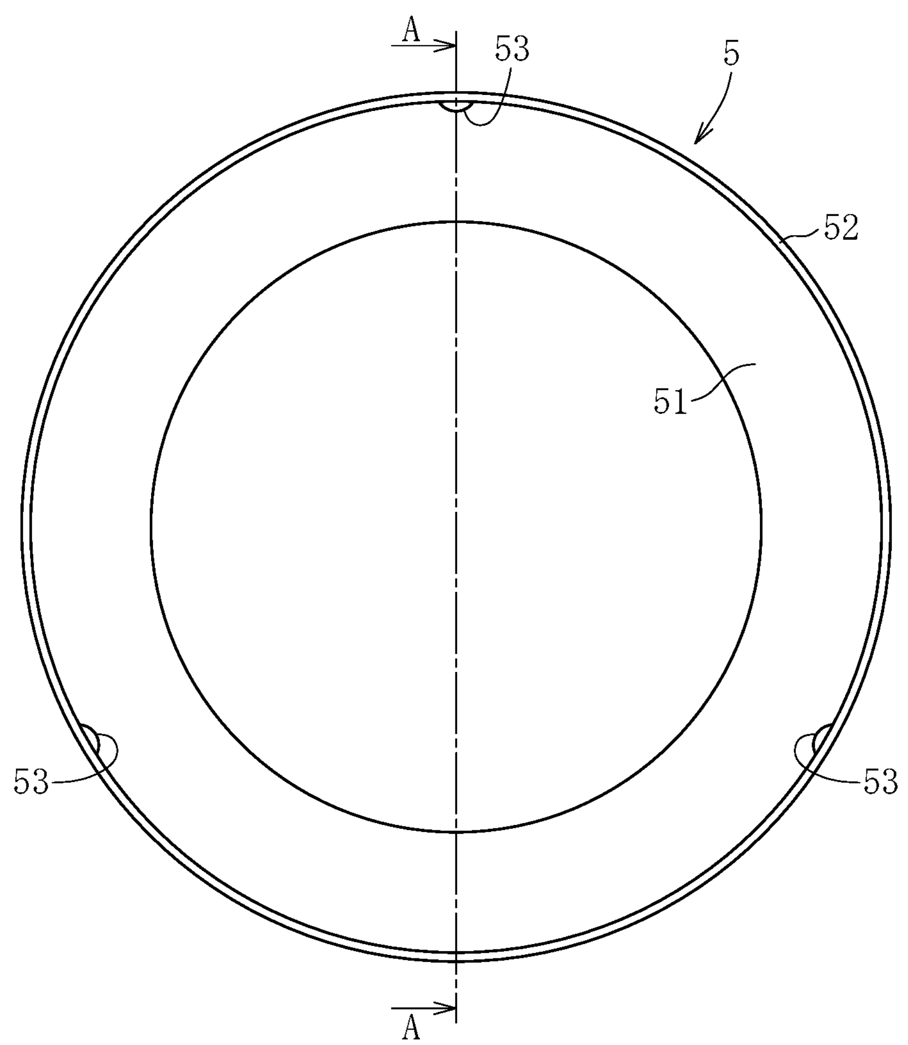
FIG. 2A is a bottom view for illustrating a washer illustrated in FIG. 1 (as viewed from a forward side in a pressing direction).
Figure 2B:
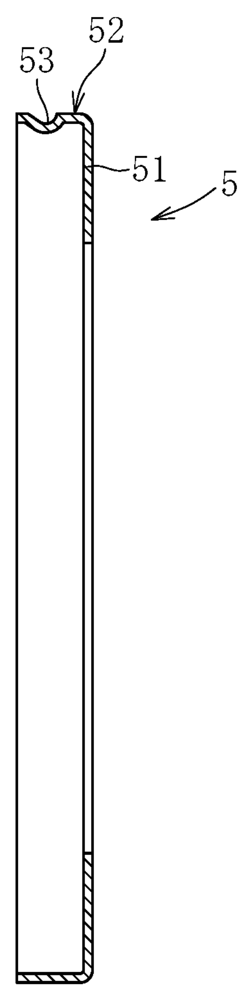
FIG. 2B is a sectional view taken along the line A-A of FIG. 2A.

As illustrated in FIG. 1, FIG. 2A, and FIG. 2B, the washer 5 is formed of a steel plate having a plate thickness of from 0.3 mm to 0.8 mm, and comprises a flat doughnut-shaped washer body 51 to be held in abutment against the end surface 14 of the inner ring 1, and a cylindrical extension portion 52 extending in an axial direction from an outer rim of the washer body 51 along an outer peripheral surface 15 of the large flange portion 13 of the inner ring 1.

At an axial intermediate portion of the extension portion 52, engaging projection portions 53 projecting radially inward are formed. In this embodiment, the engaging projection portions 53 comprise three engaging projection portions 53 located equiangularly. Although the engaging projection portions 53 are not particularly limited in number, it is preferred that seven or more engaging projection portions 53 be employed when an outer diameter (diameter) of the large flange portion 13 is 80 mm or greater.

Figure 3:
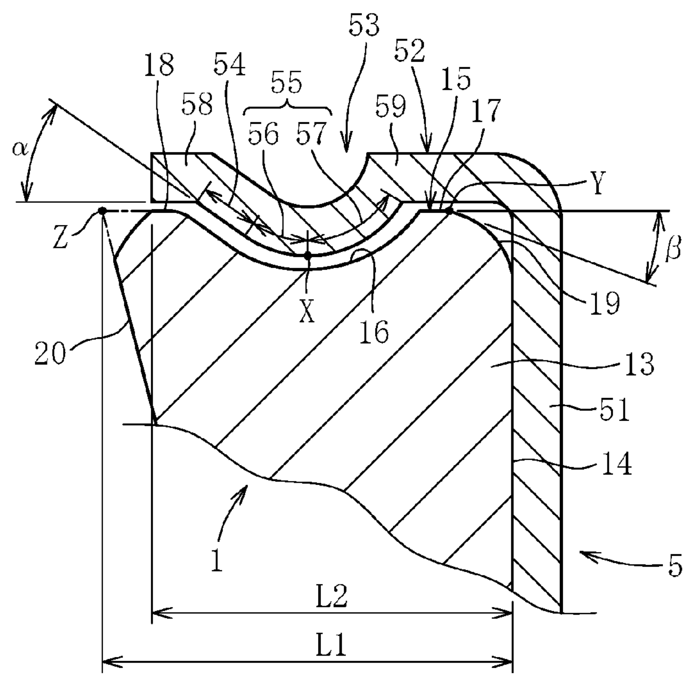
FIG. 3 is an enlarged sectional view for illustrating a main part of FIG. 1.

As illustrated in FIG. 3, each engaging projection portion 53 is engaged with an engaging recessed portion 16 formed annularly along a circumferential direction in the outer peripheral surface 15 of the large flange portion 13 of the inner ring 1. The engaging projection portion 53 is engaged with the engaging recessed portion 16 by pressing the extension portion 52 of the washer 5 onto the outer peripheral surface 15 of the large flange portion 13 of the inner ring 1. The engaging recessed portion 16 may be formed intermittently along the circumferential direction.

The engaging projection portion 53 comprises a flat surface portion 54 formed on a distal end side of the extension portion 52 and inclined radially outward, and a curved surface portion 55 formed on a proximal end side of the extension portion 52 and smoothly curved. In this case, when the washer 5 is pressed onto the outer peripheral surface 15 of the large flange portion 13 of the inner ring 1, the distal end side of the extension portion 52 corresponds to a forward side in a pressing direction, and the proximal end side of the extension portion 52 corresponds to a rearward side in the pressing direction. The engaging projection portion 53 is formed through press working or other plastic working.

The flat surface portion 54 is formed on the distal end side of the extension portion 52 with respect to a top X of the engaging projection portion 53, that is, on the forward side in the pressing direction. An inclination angle α of the flat surface portion 54 with respect to the axial direction is 45° or less, more preferably, 25° or greater and 40° or less.

The curved surface portion 55 comprises a first circular-arc portion 56 located on the forward side in the pressing direction and having a small radius of curvature, and a second circular-arc portion 57 located on the rearward side in the pressing direction and having a large radius of curvature. With this, a degree of curvature of the engaging projection portion 53 is high on the forward side in the pressing direction. As a result, in comparison with a case where the curved surface portion 55 comprises a single circular arc having a same radius of curvature equal to that of the second circular-arc portion 57, the engaging projection portion 53 is compactified in axial dimension. It is preferred that an intersection between the first circular-arc portion 56 and the second circular-arc portion 57 be located at the top X of the engaging projection portion 53 or in its vicinity (forward side in the pressing direction with respect to the top X, or rearward side in the pressing direction with respect to the top X). Further, at the intersection between the first circular-arc portion 56 and the second circular-arc portion 57, it is preferred that a tangent line of the first circular-arc portion 56 and a tangent line of the second circular-arc portion 57 be identical to each other. In this case, the first circular-arc portion 56 and the second circular-arc portion 57 continue smoothly with each other. In addition, in this embodiment, an arc length of the second circular-arc portion 57 is larger than an arc length of the first circular-arc portion 56.

In this case, the radius of curvature of the first circular-arc portion 56 ranges, for example, from 0.8 mm to 1.2 mm, and the radius of curvature of the second circular-arc portion 57 ranges, for example, from 1.21 mm to 1.6 mm. Further, the curved surface portion 55 may comprise three or more circular-arc portions having different radii of curvature.

The engaging recessed portion 16 has a shape conforming to the engaging projection portion 53. Thus, when the engaging projection portion 53 is compactified in axial dimension as described above, the engaging recessed portion 16 may also be compactified in axial dimension accordingly. As a result, on the outer peripheral surface 15 of the large flange portion 13, large areas may secured for flat portions 17 and 18 other than the engaging recessed portion 16. Particularly, when the flat portion 18 on the roller side of the outer peripheral surface 15 of the large flange portion 13 is secured, there is an advantage of preventing occurrence of damage such as chipping on the roller side.

Even under a state in which the engaging projection portion 53 and the engaging recessed portion 16 are engaged with each other, axial gaps and radial gaps are formed between the engaging projection portion 53 and the engaging recessed portion 16. Specifically, the axial gaps are formed on both axial sides of the engaging projection portion 53 when the washer body 51 is held in abutment against the end surface 14 of the inner ring 1. Further, under the state in which the engaging projection portion 53 and the engaging recessed portion 16 are engaged with each other, the radial gaps are formed also between flat portions 58 and 59 of the extension portion 52 and the flat portions 17 and 18 of the large flange portion 13. With this, a dimensional tolerance of the washer 5 may be relaxed, and hence the washer 5 need not be finished through grinding or the like. In addition, such gaps allow the engaging projection portion 53 of the washer 5 to be easily fitted to the engaging recessed portion 16 of the inner ring 1 even through manual work.

Further, even when the washer body 51 is held in abutment against the end surface 14 of the inner ring 1, the gaps formed between the engaging projection portion 53 and the engaging recessed portion 16 prevent both the engaging projection portion 53 and the engaging recessed portion 16 from coming into forceful contact with each other. With this, after the engaging projection portion 53 and the engaging recessed portion 16 are engaged with each other, the engaging projection portion 53 and the engaging recessed portion 16 may be prevented from being damaged at the time of the contact therebetween.

At an intersecting portion between the end surface 14 of the inner ring 1 and the outer peripheral surface 15 of the large flange portion 13 of the inner ring 1, a chamfered portion 19 is formed. The chamfered portion 19 functions as a guide surface for guiding the engaging projection portion 53 onto the outer peripheral surface 15 of the large flange portion 13 of the inner ring 1, and has a smooth convex curved surface.

At an intersection Y between the outer peripheral surface 15 (flat portion 17) of the large flange portion 13 of the inner ring 1 and the chamfered portion 19, an inclination angle β of a tangent line of the chamfered portion 19 with respect to the axial direction is 45 degrees or less, more preferably, 10° or greater and 20° or less.

Assuming that L1 represents an axial dimension (length of large flange portion) from an intersection Z between an imaginary extension line of the flat portion 18 of the large flange portion 13 and an imaginary extension line of a regulating surface 20 of the large flange portion 13 for the tapered rollers 3 to the end surface 14 of the large flange portion 13 of the inner ring 1, and that L2 represents an axial dimension (length of extension portion) from the washer body 51 to the distal end of the extension portion 52, it is preferred that L2 be 80 percent or greater and less than 100 percent. This is because, when the length L2 of the large flange portion is excessively smaller than the length L1 of the extension portion, the washer 5 is more liable to be inclined, and the washer 5 is more liable to be disengaged. Thus, from a viewpoint of preventing the inclination of the washer 5, it is preferred that the length L1 of the extension portion and the length L2 of the large flange portion have a relationship satisfying the above-mentioned numerical range.

Figure 4:
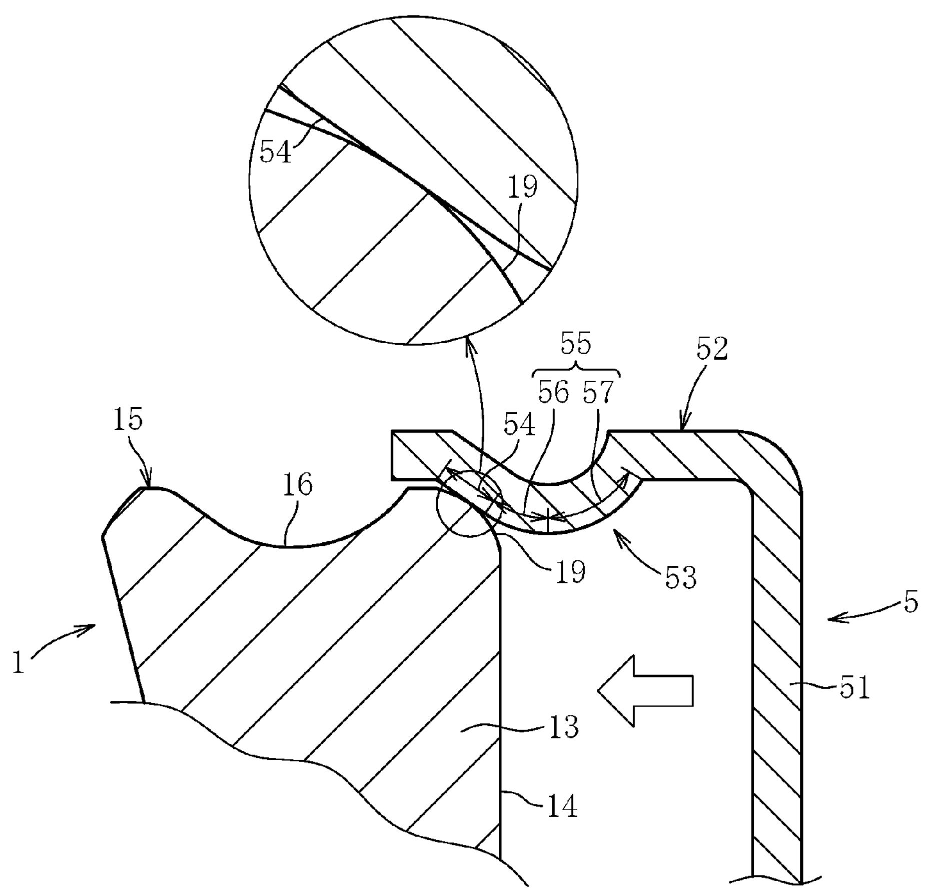
FIG. 4 is an explanatory view for illustrating a procedure for mounting the washer to an inner ring in the tapered roller bearing according to the embodiment (initial state).

The tapered roller bearing configured as described above has the following advantage at the time of mounting the washer 5. Specifically, as illustrated in FIG. 4, when the washer 5 is pressed in the axial direction (direction indicated by the arrow of FIG. 4) from the end surface 14 side of the inner ring 1 onto the outer peripheral surface 15 of the large flange portion 13 of the inner ring 1, first, the flat surface portion 54 of the engaging projection portion 53 comes into contact with the chamfered portion 19 of the inner ring 1. At this time, as illustrated on an enlarged scale in FIG. 4, the curved surface of the chamfered portion 19 and a flat surface of the flat surface portion 54 come into contact with each other, and hence the engaging projection portion 53 is less liable to be halfway stuck to the chamfered portion 19. Thus, as illustrated in FIG. 5, the flat surface portion 54 of the engaging projection portion 53 may be moved smoothly along the chamfered portion 19, and the extension portion 52 may be elastically deformed radially outward.

Figure 5:
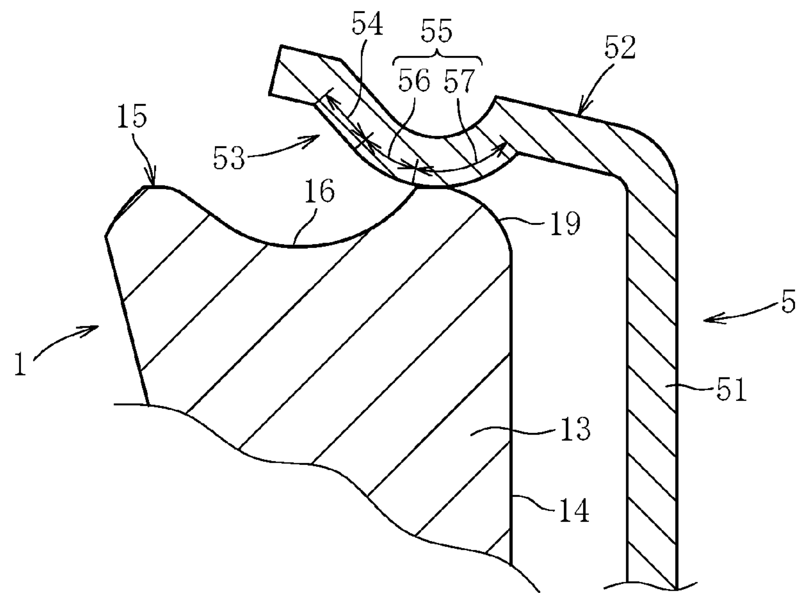
FIG. 5 is an explanatory view for illustrating the procedure for mounting the washer to the inner ring in the tapered roller bearing according to the embodiment (intermediate state).
Figure 6:
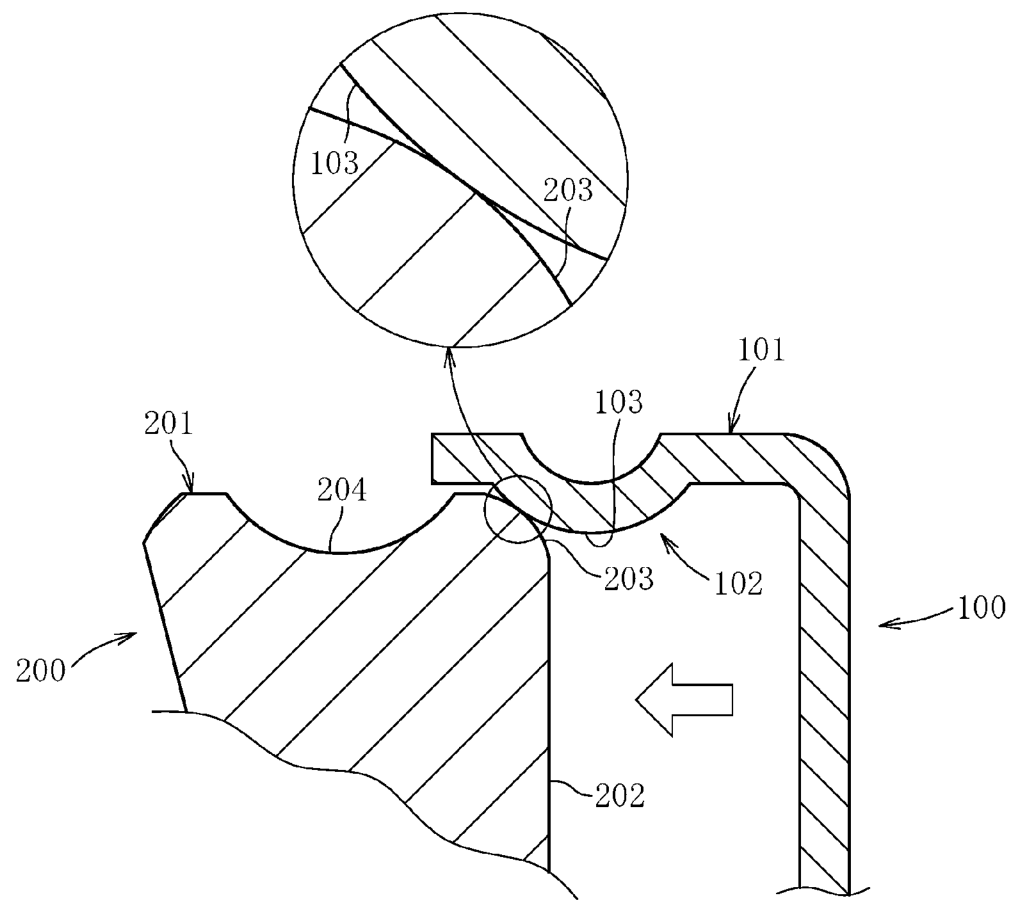
FIG. 6 is an explanatory sectional view for illustrating a problem with a related-art washer-equipped tapered roller bearing.

Further, as the engaging projection portion 53 is further pressed, as illustrated in FIG. 5, the curved surface portion 55 of the engaging projection portion 53 comes into contact with the chamfered portion 19. In this stage, by a guiding function of the flat surface portion 54, the engaging projection portion 53 is moved close to the outer peripheral surface 15 of the large flange portion 13 of the inner ring 1. Thus, only by causing slight elastic deformation of the extension portion 52 radially outward with the curved surface portion 55, the engaging projection portion 53 easily overrides the outer peripheral surface 15 of the large flange portion 13 of the inner ring 1. Thus, even when the curved surface portion 55 comes into contact with the chamfered portion 19, the curved surface portion 55 and the chamfered portion 19 are not stuck to each other.

In this way, the flat surface portion 54 and the curved surface portion 55 of the engaging projection portion 53 may be moved smoothly along the chamfered portion 19, and stress concentration on the engaging projection portion 53 may be alleviated. As a result, even when the hardened layers are formed on the surfaces of the washer 5, a risk of damage such as cracking of the washer 5 may be prevented.

Further, because the stress concentration on the engaging projection portion 53 of the washer 5 is less liable to occur, the clearances between the extension portion 52 of the washer 5 and the outer peripheral surface 15 of the large flange portion 13 of the inner ring 1 may be reduced. When the clearances between the extension portion 52 and the outer peripheral surface 15 are reduced, there is an advantage in that the state of engagement between the engaging projection portion 53 and the engaging recessed portion 16 is stabilized, and hence the washer 5 is less liable to be disengaged from the inner ring 1. Clearances (radial gaps) between parts other than the engaging projection portion 53 in the extension portion 52 and parts other than the engaging recessed portion 16 in the outer peripheral surface 15 of the large flange portion 13 of the inner ring 1 have, for example, a radial dimensional difference of from 0.10 mm to 0.40 mm.

In this case, when the engaging projection portion 53 under the state of FIG. 5 is further pressed, while the extension portion 52 is restored radially inward by its elastic restoring force, the engaging projection portion 53 is engaged with the engaging recessed portion 16. With this, the washer 5 is stably mounted to the inner ring 1.

The present invention is not limited to the above-mentioned embodiment, and may be carried out in various modes.

In the embodiment described above, the extension portion 52 has a continuous cylindrical shape. However, the extension portion 52 may be formed intermittently along the circumferential direction.

In the embodiment described above, the curved surface portion 55 of the engaging projection portion 53 comprises the two or more circular-arc portions having different radii of curvature. However, the curved surface portion 55 may comprise a single circular-arc portion having a single radius of curvature.

In the above-mentioned embodiment, the tapered ball bearings are described as rolling bearings, but the present invention is applicable also to other roller bearings such as a cylindrical roller bearing and a ball bearing.

REFERENCE SIGNS LIST

1 inner ring
11 raceway surface

12 small flange portion
13 large flange portion
14 end surface
15 outer peripheral surface
16 engaging recessed portion
19 chamfered portion
2 outer ring
21 raceway surface
3 tapered roller
4 cage
5 washer
51 washer body
52 extension portion
53 engaging projection portion
54 flat surface portion
55 curved surface portion
56 first circular-arc portion
57 second circular-arc portion
6 gear shaft
61 flange portion
62 end surface

The invention claimed is:

1. A rolling bearing, comprising:
- an inner ring;
- an outer ring;
- a plurality of rolling elements received in an annular space between the inner ring and the outer ring; and
- a washer comprising:
  - a washer body to be held in contact with an end surface of the inner ring; and
  - an extension portion extending from the washer body along an outer peripheral surface of the inner ring,
- wherein the inner ring comprises:
  - an engaging recessed portion formed in the outer peripheral surface thereof; and
  - a chamfered portion formed at an intersecting portion between the end surface and the outer peripheral surface,
- wherein the extension portion of the washer comprises an engaging projection portion,
- wherein the extension portion and the engaging recessed portion are engaged with each other by pressing the extension portion of the washer onto the outer peripheral surface of the inner ring, and
- wherein the engaging projection portion comprises:
  - a rounded curved surface portion; and
  - a flat surface portion formed continuously with a forward side in a pressing direction of the rounded curved surface portion and inclined radially outward.

2. The rolling bearing according to claim 1, wherein the curved surface portion comprises a plurality of circular-arc portions having different radii of curvature, and a radius of curvature of a circular-arc portion located on the forward side in the pressing direction is smaller than a radius of curvature of another circular-arc portion located on a rearward side in the pressing direction.

3. The rolling bearing according to claim 2, wherein the flat surface portion forms an inclination angle of 45 degrees or less.

4. The rolling bearing according to claim 3, wherein, at an intersection between the outer peripheral surface and the chamfered portion, a tangent line of the chamfered portion forms an inclination angle of 45 degrees or less.

5. The rolling bearing according to claim 3, wherein a surface of the washer is subjected to hardening treatment.

6. The rolling bearing according to claim 2, wherein, at an intersection between the outer peripheral surface and the chamfered portion, a tangent line of the chamfered portion forms an inclination angle of 45 degrees or less.

7. The rolling bearing according to claim 2, wherein a surface of the washer is subjected to hardening treatment.

8. The rolling bearing according to claim 2,
- wherein the curved surface portion comprises:
  - a first circular-arc portion located on the forward side in the pressing direction and having a small radius of curvature; and
  - a second circular-arc portion located on the rearward side in the pressing direction and having a large radius of curvature, and
- wherein an intersection between the first circular-arc portion and the second circular-arc portion is located at a top of the engaging projection portion.

9. The rolling bearing according to claim 8, wherein the flat surface portion forms an inclination angle of 45 degrees or less.

10. The rolling bearing according to claim 9, wherein, at an intersection between the outer peripheral surface and the chamfered portion, a tangent line of the chamfered portion forms an inclination angle of 45 degrees or less.

11. The rolling bearing according to claim 9, wherein a surface of the washer is subjected to hardening treatment.

12. The rolling bearing according to claim 8, wherein, at an intersection between the outer peripheral surface and the chamfered portion, a tangent line of the chamfered portion forms an inclination angle of 45 degrees or less.

13. The rolling bearing according to claim 8, wherein a surface of the washer is subjected to hardening treatment.

14. The rolling bearing according to claim 1, wherein the flat surface portion forms an inclination angle of 45 degrees or less.

15. The rolling bearing according to claim 14, wherein, at an intersection between the outer peripheral surface and the chamfered portion, a tangent line of the chamfered portion forms an inclination angle of 45 degrees or less.

16. The rolling bearing according to claim 14, wherein a surface of the washer is subjected to hardening treatment.

17. The rolling bearing according to claim 1, wherein, at an intersection between the outer peripheral surface and the chamfered portion, a tangent line of the chamfered portion forms an inclination angle of 45 degrees or less.

18. The rolling bearing according to claim 17, wherein a surface of the washer is subjected to hardening treatment.

19. The rolling bearing according to claim 1, wherein a surface of the washer is subjected to hardening treatment.

20. The rolling bearing according to claim 1,
- wherein the outer peripheral surface of the inner ring comprises:
  - a tapered raceway surface;
  - a small flange portion formed on a small-diameter side of the tapered raceway surface; and
  - a large flange portion formed on a large-diameter side of the tapered raceway surface,
- wherein an inner peripheral surface of the outer ring comprises a tapered raceway surface, and
- wherein the rolling elements comprise tapered rollers received in a freely rollable manner in an annular space formed between the raceway surface of the inner ring and the raceway surface of the outer ring.

* * * * *